(12) United States Patent
Kögler et al.

(10) Patent No.: US 6,543,780 B1
(45) Date of Patent: Apr. 8, 2003

(54) METHOD OF AND DEVICE FOR SEALING A GAP

(75) Inventors: Markus Kögler, Buchloe (DE); Franz Heimpel, Affing (DE); Silvia Huber, Neusäss (DE); Peter Vogel, Untermeitingen (DE)

(73) Assignee: Hilti Aktiengesellschaft, Schaan (LI)

( * ) Notice: Subject to any disclaimer, the term of this patent is extended or adjusted under 35 U.S.C. 154(b) by 18 days.

(21) Appl. No.: 09/715,545

(22) Filed: Nov. 17, 2000

(30) Foreign Application Priority Data

Nov. 19, 1999 (DE) .......................... 199 55 764

(51) Int. Cl.[7] .......................... F16J 15/02; F16L 17/00; F16L 21/02; F16L 41/00; F16L 55/10
(52) U.S. Cl. .................. 277/312; 277/314; 277/316; 277/616; 277/637; 285/216; 138/89
(58) Field of Search ................ 277/312, 314, 277/316, 602, 603, 608, 609, 628, 630, 637, 616; 285/305, 308, 312, 216; 138/89

(56) References Cited

U.S. PATENT DOCUMENTS

| | | | | |
|---|---|---|---|---|
| 1,297,113 A | * | 4/1919 | Domenico | 285/216 |
| 2,152,429 A | * | 4/1939 | Cave | 285/216 |
| 2,602,513 A | * | 7/1952 | Conrad et al. | 166/179 |
| 3,045,830 A | * | 7/1962 | Fulton | 210/232 |
| 3,550,636 A | | 12/1970 | Hearne | |
| 3,577,737 A | * | 5/1971 | Burleson | |
| 3,649,034 A | * | 3/1972 | Barton | 277/606 |
| 3,964,754 A | * | 6/1976 | Murai et al. | 138/108 |
| 3,993,103 A | * | 11/1976 | Hammer | 138/89 |
| 4,111,233 A | * | 9/1978 | Takashi | 138/89 |
| 4,326,407 A | * | 4/1982 | Van Meter et al. | 285/102 |
| 4,607,469 A | * | 8/1986 | Harrison | 138/89 |
| 5,168,902 A | * | 12/1992 | Hood | 138/89 |
| 5,697,194 A | * | 12/1997 | Gignac et al. | 138/106 |
| 6,080,134 A | * | 7/2000 | Lotti et al. | 285/216 |

FOREIGN PATENT DOCUMENTS

| | | |
|---|---|---|
| DE | 8138267 | 4/1982 |
| DE | 8527622 | 1/1986 |
| DE | 8420844 | 8/1987 |
| DE | 3623552 | 10/1987 |
| FR | 1285314 | 1/1962 |

\* cited by examiner

*Primary Examiner*—Anthony Knight
*Assistant Examiner*—Vishal Patel
(74) *Attorney, Agent, or Firm*—Sidley Austin Brown & Wood, LLP

(57) ABSTRACT

A method of and a device for sealing a gap (4) between a leadthrough (2) arranged in a constructional element (1) and an object (3) extending through the leadthrough (2), according to which an elastic sealing element (6) which surrounds the object (3) is placed in the gap (6) and is compressed in an axial direction of the leadthrough (2) and is fixed in its compressed condition with a fastening element (7).

7 Claims, 3 Drawing Sheets

METHOD OF AND DEVICE FOR SEALING A GAP

BACKGROUND OF THE INVENTION

1. Field of the Invention

The invention relates to a method of sealing a gap between a leadthrough arranged in a constructional element and an object extending through the leadthrough by arranging at least one sealing element in the gap. The invention further relates to a device for sealing such a gap.

2. Description of the Prior Art

Sealing elements are often used for sealing gaps between guides, which are located in constructional elements, such as house walls, and through which tubes or cables extend. The gap between the guide or leadthrough and the object extending therethrough can be sealed in different ways. To this end, often, mechanical sealing means is used. In this case, rigid sealing elements fill the annular gap and seal the gap by formlockingly engaging the respective elements or by being elastically compressed. As an alternative, chemical sealing means is used. In this case, the annular gap is filled with reactive systems which harden in the gap, sealing the same. As reactive systems, e.g., inorganic systems such as, e.g., mortar, can be used, or organic systems such as sealing masses, polymer foam, and the like are used. Also, combination chemical-mechanical seals can be used. In this case, as a rule, a suitable casing, capable of receiving a chemical system, is arranged in a gap.

The known mechanical solutions are expensive, time and labor consuming and can be used with tubes (pipes), cables, and leadthroughs having a predetermined diameter. Using chemical means permits to avoid these drawbacks. However, the chemical means does not provide any lasting protection from water penetration. This drawback is connected with materials themselves when, e.g., a cellular foam is used, or when the sealing material, e.g., polyethylene, does not adhere properly to the constructional element which can result in a non-complete sealing of the leadthrough.

Accordingly, an object of the present invention is to provide a method of and a device for sealing a gap between a leadthrough and an object extending therethrough with simple and cost-effective means.

Another object of the present invention is to provide a method of and a device for sealing a gap between a leadthrough and an object extending therethrough which would insure a rapid and reliable sealing of the gap.

SUMMARY OF THE INVENTION

These and other objects of the present invention, which will become apparent hereinafter, are achieved by providing a method according to which an elastic sealing element is located in the gap, surrounding the objects, and is, thereafter, compressed in an axial direction of the leadthrough and is fixed in its compressed condition with a fastening element.

After the sealing element has been placed in the leadthrough, and the object has been pushed therethrough, the sealing element is axially compressed by the fastening element. Upon being compressed, the sealing element expands radially outwardly, pressing against the inner wall of the leadthrough. Simultaneously, the sealing element presses inwardly against the object. As a result, the gap becomes sealed in both directions, toward the inner wall of the leadthrough and toward the object extending through the leadthrough. The compressed condition of the sealing element is retained by the fastening element which is locked in its position corresponding to the sealing position of the sealing element.

The present invention provides an effective and reliable possibility of sealing a gap, which permits to close sealingly a gap the size of which varies within certain limits, and which invention can be used with leadthroughs having different sizes. The expanded range is insured due to the fact that the necessary radial expansion of the sealing element, which results from applying pressure to the sealing element in axial direction of the leadthrough, can be adjusted. The present invention permits to reduce the costs of the sealing process as it substantially reduces the time necessary to form the sealing.

According to the present invention, after securing the sealing element in its compressed condition, the fastening element can be withdrawn from the leadthrough if it is not necessary for maintaining of the compressed condition of the sealing element. The elements necessary for the retention of the sealing element in its compressed condition may be formed, e.g., by portions of the pull rods which are provided with gripping handles with which the opposite surfaces of the sealing element are displaced toward each other in the axial direction of the leadthrough. When these portions of the pull rods should not project from the leadthrough, they can be separated in the respective regions of predetermined breaking points.

A device according to the present invention for sealing a gap between a leadthrough, which is provided in a constructional component, and an object extending through the leadthrough includes an elastic sealing element having a through-opening suitable for receiving the object, and a fastening element connected with the sealing element and capable of compressing the sealing element in the axial direction of the leadthrough.

The sealing and fastening elements form together a unitary assembly which can be inserted in a leadthrough provided in a constructional component. After an object, e.g., a cable or a tube, has been passed through the through-opening of the sealing element, the fastening element is actuated, compressing the sealing element in the axial direction of the leadthrough. The sealing element expands radially, pressing against the object and the circumferential wall of the leadthrough, which result in impervious, in particular, fluid-tight sealing of the gap.

A particularly good sealing is obtained when the sealing element is formed as a ball having a central substantially cylindrical opening for receiving a cable, tube and the like. By compressing the wall regions of the ball in the vicinity of the cable or the tube, a very good radial expansion of the ball is obtained which takes place in a direction transverse to the longitudinal axis of the cable or the tube.

According to the present invention, the sealing element can be formed of a solid material or a material containing hollow spaces. In all cases, the sealing element is elastically compressed. When the sealing element is formed of a solid material, relatively high pressure forces are obtained which is advantageous when, e.g., the gap need be sealed against penetration of water. When the sealing element is formed of an empty spaces-containing material, smaller pressure forces are necessary for obtaining sealing.

Preferably, in order to obtain a lasting sealing, the sealing element is formed of a watertight or waterproof material.

According to a particularly advantageous embodiment of the present invention, the fastening element includes adjusting elements provided at axially opposite regions of the sealing element and movable toward each other at least in vicinity of the through-opening. The adjusting elements can be actuated with different mechanisms and serve for compressing the sealing element in the axial direction of the leadthrough. The adjusting elements leave a sufficient free space in the radial direction of the sealing element, that the sealing element can expand radially upon being compressed in the axial direction of the leadthrough.

Preferably, the adjusting elements are formed as circular elements or rings in order to be able to apply as uniform compression force as possible over the circumferences of the through-opening. The application of a uniform compression force provides for a uniform radial expansion of the sealing element and, thereby, a reliable sealing of the leadthrough. As it has already been mentioned, there exist different possibilities of operating the adjusting elements. One of the possibilities consists in providing an axial screw between the spaced from each other, adjusting elements which extends through the sealing element. The axial screw engages with its head the front adjusting element, with its threaded portion being screwed in the rear adjusting element. Upon rotation of the screw with a screwdriver, the front and rear elements move toward each other, compressing the sealing element. Several such screws, equidistantly angularly spaced from each, can be provided over the circumference of the sealing element.

Another possibility of operating the adjusting elements consists in using of pull rods extending through the sealing element. First pull rods are secured to the front adjusting element and project from the leadthrough. Second pull rods are secured to the rear adjusting element, extend through the sealing element and, likewise, project from the leadthrough in the direction of the first pull rods. Both the first and second pull rods are provided with handles. When the pull rods are displaced relative to each other, by being pulled over the handles, the sealing element is compressed by the adjusting elements. The pull rods can be stopped in a pre-determined positions by using, e.g., a ratchet mechanism. The stoppage of the pull rods provides for the retention of the sealing element in its compressed position.

It is also possible to operate the pull rods, which extend through the sealing element, with eccentrics supportable on one of the adjusting elements.

It is also possible to displace the adjusting elements toward each other with a tension spring provided therebetween after a lock has been lifted.

Finally, with the adjusting elements being provided with threaded bores, a nut coaxial with the through-opening of the sealing element and through which the cable or tube extends, can be used for displacing the adjusting elements toward each other.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
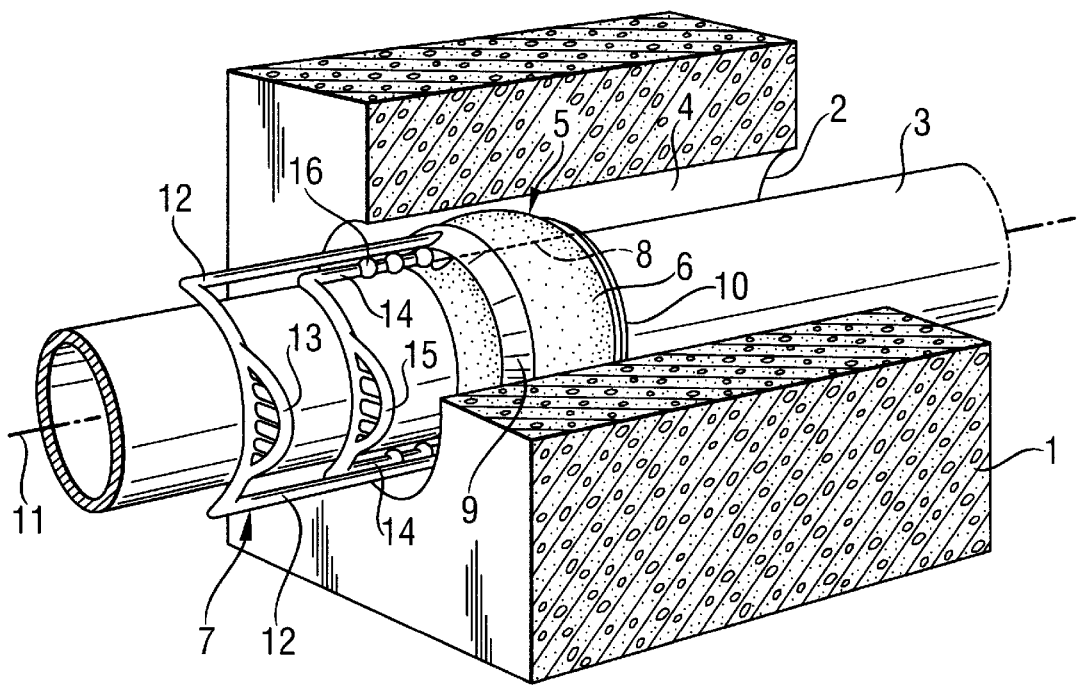
FIG. 1 a perspective view of a sealing device according to the present invention with a not yet compressed spherical sealing element.

FIG. 1 shows a constructional element 1 which, e.g., can represent a wall of a house. In the constructional element 1, there is arranged a leadthrough 2 which extends perpendicular to the wall surface and has a through-bore with a comparatively constant inner diameter. An object 3 extends through the leadthrough 2 and is formed here as a tube, but can be a cable. The outer diameter of the object 3 is somewhat smaller than the inner diameter of the leadthrough 2 so that an annular gap 4 is formed between tube 3 and the inner diameter of the leadthrough 2.

Figure 2:
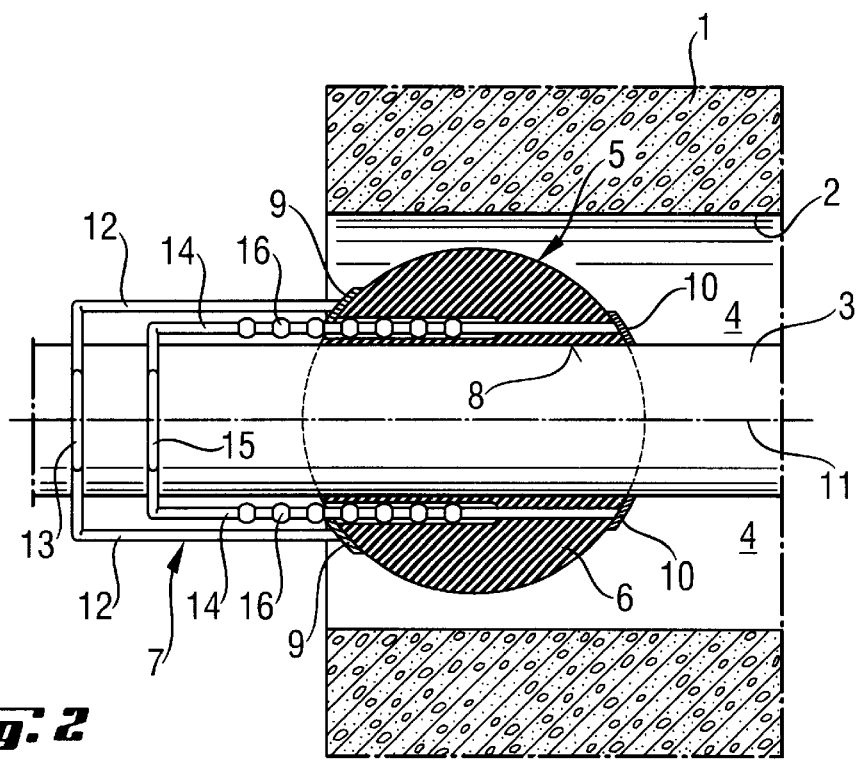
FIG. 2 an axial cross-sectional view of the sealing device shown in FIG. 1.

The comparative ratios of all of the elements are shown in FIG. 2.

A sealing device 5 according to the present invention surrounds object 3 in the region of the leadthrough 2. The sealing device 5 is formed of a ball-shaped sealing element 6 and a fastening element 7. The sealing element 6 and the fastening element 7 form a unitary mounting unit.

As particularly shown in FIG. 2, the ball-shaped sealing element 6 has a cylindrical through-opening 8 provided along the axis 11 of the sealing element 6. The outer diameter of the tube 3 corresponds at least approximately to the inner diameter of the through-opening 8. The outer diameter of the ball-shaped sealing element 6 is somewhat smaller than the inner diameter of the leadthrough 2 so that the sealing device 5 can be easily pushed into the leadthough 2.

The fastening element 7 includes, as best shown in FIG. 2, front adjusting ring 9 and rear adjusting ring 10 which are arranged coaxially with respect to the longitudinal axis 11 of the sealing element 6. It is to be noted that the axis 11 of the sealing element 6 coincides with the axis of the leadthrough 2. Both adjusting rings 9 and 10 can be fixedly connected with the ball-shaped sealing element 6, e.g., glued thereto. A first pull rod 12 extends from the first adjusting ring 9 to the left, as shown in FIGS. 1 and 2. There can be provided a plurality of pull rods 12 arranged over the circumference of the adjusting ring 9 and spaced from each other by the same angular distance, with all of the pull rod 12 extending parallel to the axis 11. The pull rods 12 are connected with each other at their free end with a first handle 13. Second pull rods 14 extend from the second adjusting ring 10 likewise to the left in the plane of the drawing. The pull rods 14 extend through the sealing element 6 likewise parallel to the axis 11. A plurality of equidistantly angularly spaced, pull rods 14 can be secured to the adjusting ring 10 over its circumference. At their free ends, the second pulls rods 14 are connected with each other with a second handle 15. Advantageously, however, they are provided only two first pull rods 12 and only two second pull rods 14 in order to make the construction of the fastening element as simple as possible. The length of the pull rods 12 and 14 is so selected that they both extend past the wall of the constructional out of the leadthrough 2, with the first pull rods 12 extending farther away than the second pull rods 14. As a result, the first handle 13 is located in front of the second handle 15 at a distance therefrom.

Figure 3:
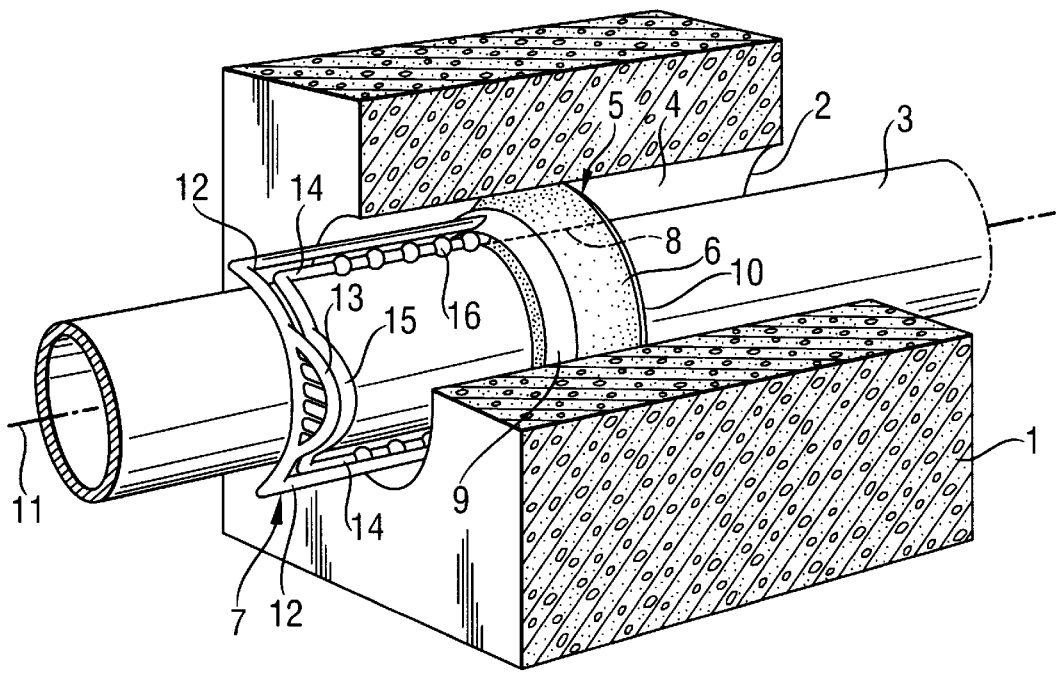
FIG. 3 a perspective view of the sealing device shown in FIG. 1 with a compressed sealing element.

When, after the installation, of the sealing device 5, the first and second handles 13 and 15 are displaced toward each other, the annular sections of the ball-shaped element 6 are likewise pulled toward each other, with the sealing element 6 being compressed. The respective changes can be seen in FIGS. 3–4, where the same elements are designated with the same reference numerals. As it can particularly be seen in FIG. 4, the ball-shaped sealing element 6 is so compressed by the first and second adjusting rings 9 and 10 that it expands in a direction transverse to the axis 11 and is pressed against the inner wall of the leadthrough 2. At the same time, the ball-shaped sealing element 6 remains pressed against the object or tube 3, so that the annular gap 4 becomes sealingly closed.

Figure 4:
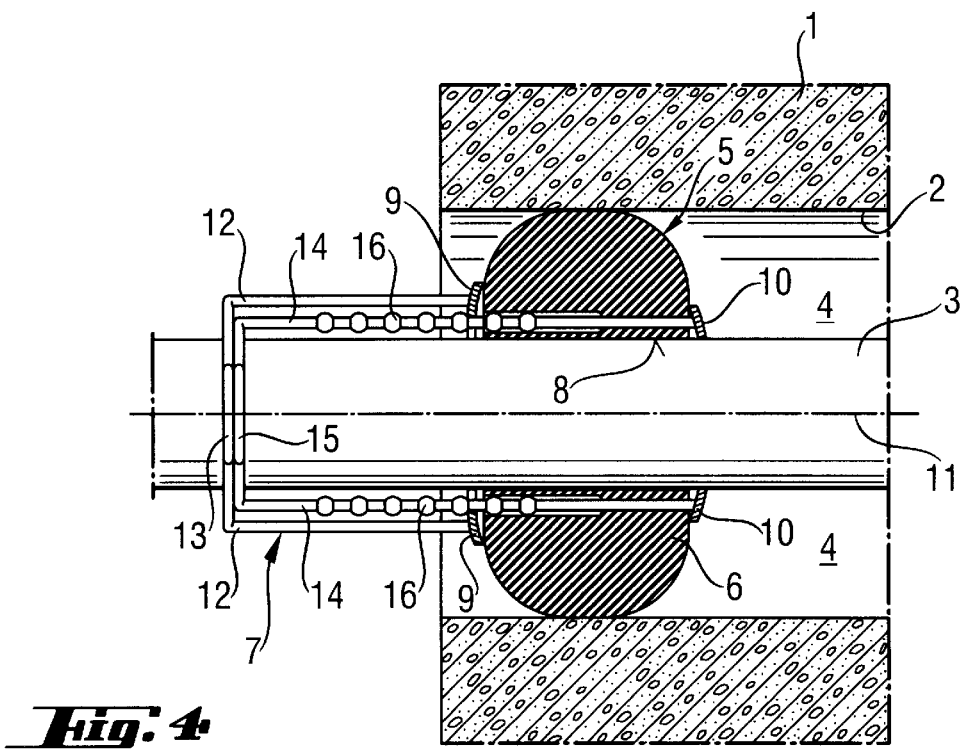
FIG. 4 an axial cross-sectional view of the device shown in FIG. 3.

As can particularly be seen in FIGS. 2 and 4, the fastening element 7 is provided with a ratchet mechanism. The ratchet mechanism includes ball-shaped elements 16 provided on the second pull rods 14 which are pulled through the ratchet opening formed in the first adjusting ring 9 when the handles 13 and 15 are pulled to each other from a position shown in FIG. 2 to a position shown in FIG. 4. When pulled in this direction, the ball-shaped elements 16 can be more easily pulled through the ratchet opening than when they are displaced in the opposite direction, preventing displacement of the handles 13 and 15 away from each other.

Figure 5:
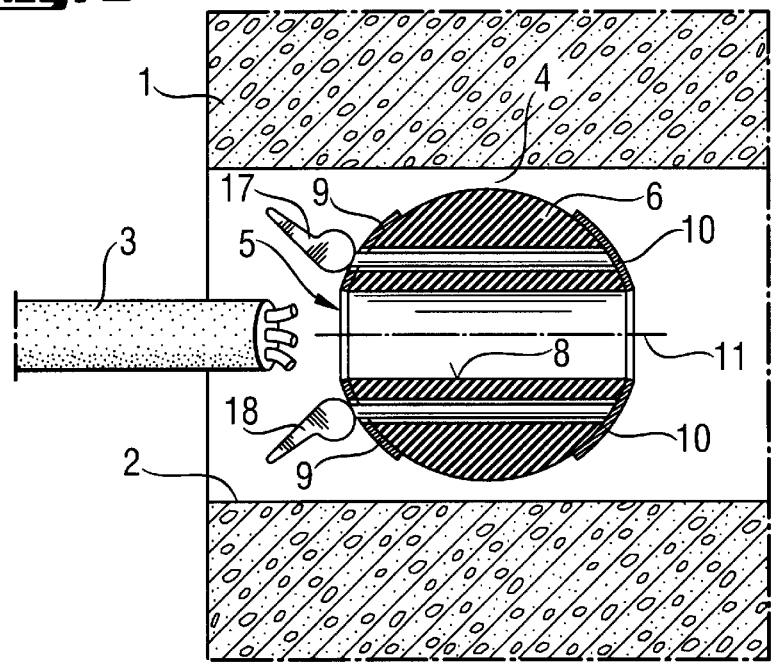
FIG. 5 an axial cross-sectional view of another embodiment of a sealing device according to the present invention with a not yet compressed sealing element.
Figure 6:
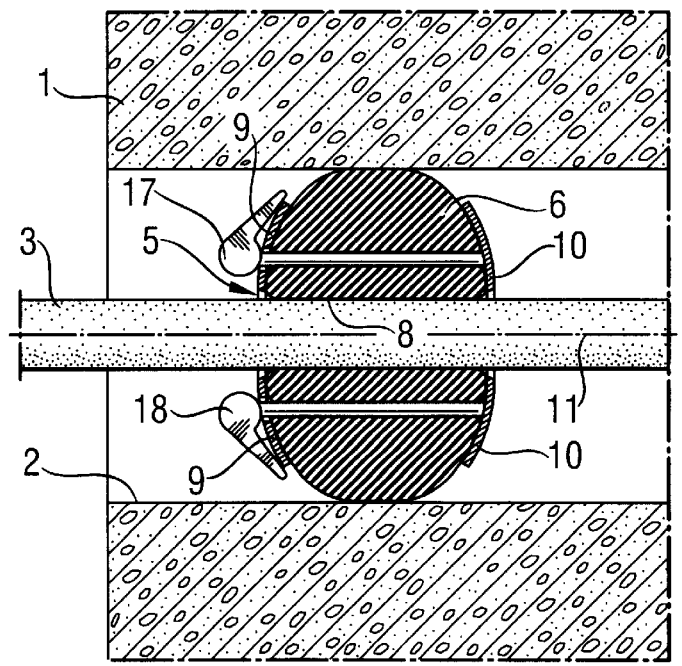
FIG. 6 a view of the sealing device shown in FIG. 5 with a compressed sealing element.

A second embodiment of a sealing device 5 according to the present invention is shown in FIGS. 5–6, with the elements of FIGS. 5–6 identical to those of FIGS. 1–4 being designated with the same reference numerals.

In the embodiments shown in FIGS. 5–6, the front and rear adjusting rings 9 and 10 are displaced relative to each other with eccentric adjusting levers 17 and 18. They are displaced again along the longitudinal axis 11. FIG. 5 shows an initial position of the sealing device 5 in which the spherical sealing element 6 has not yet been deformed. FIG. 6 shows a condition of the sealing element 6 after the displacement of the adjusting rings 9 and 10 toward each other, with the sealing element 6 being deformed and pressing against both the cable 3 and the inner wall of the leadthrough 2. The adjusting ring displacement mechanism is formed of the eccentric adjusting levers 17 and 18 and is shown in FIGS. 5–6 only schematically. In the initial position of the displacement mechanism, with the adjusting levers 17 and 18 occupying their initial position, the sealing device 5 can easily be positioned in the leadthrough 2. After the installation of the sealing device 5 in the leadthrough 2, the eccentric adjusting levers 17 and 18 are displaced from their initial position into their operational position, and the adjusting rings 9 and 10 are moved thereby toward each other, deforming the sealing element 6. This leads to closing of the annular gap 4. The eccentric adjusting levers 17 and 18 are self-locked in their operational position, retaining thereby the adjusting rings 9 and 10 in their displaced position.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A method of sealing a gap (4) between a leadthrough (2) arranged in a constructional element (1) and an object (3) extending through the leadthrough (2), the method comprising the steps of providing an elastic sealing element (6) formed as a sphere and having a cylindrical through-opening for receiving the object (3); placing in the gap (4) the elastic sealing element which surrounds the object (3); compressing the sealing element (6) in an axial direction of the leadthrough (2) and fixing the sealing element (6) in a compressed condition thereof with a fastening element (7); the fastening element having pull rods (12, 14) and adjusting elements (9, 10); the adjusting elements (9, 10) are provided at axially opposite regions of the sealing element; at least one of the pull rods (14) having means (16) for securing the pull rods in a position; and withdrawing a portion of the fastening element (7) out of the leadthrough (2) after the sealing element has been fixed in the compressed condition thereof.

2. A device for sealing a gap (4) between a leadthrough (2) arranged in a constructional element (1) and an object (3) extending through the leadthrough (2), the device comprising an elastic sealing element (6) having a through-opening (8) suitable for receiving the object (3) therein, and a fastening element (7) connected with the sealing element (6) and capable of compressing the sealing element (6) in an axial direction of the through-opening (8), wherein the sealing is formed as a ball and the through-opening is formed as a cylindrical opening, wherein the fastening element (7) includes adjusting elements (9, 10) provided at axially opposite regions of the sealing element (6) and movable toward each other at least in vicinity of the through-opening (8), and wherein the fastening element (7) includes pull rods (14), at least one of the pull rods (14) having means (16) for securing the pull rods in a position, the pull rods extending through the sealing element (6) for displacing the adjusting elements (9, 10) toward each other.

3. A device as set forth in claim 2, wherein the sealing element (6) is formed of a solid material.

4. A device as set forth in claim 2, wherein the sealing element (6) includes hollow spaces.

5. A device as set forth in claim 2, wherein the sealing element (6) is formed of a water-tight material.

6. A device as set forth in claim 2, wherein the adjusting elements (9, 10) are formed as rings.

7. A device as set forth in claim 2, wherein the means are ball means for securing the pull rods in the position.

\* \* \* \* \*